April 9, 1929.  C. C. ABEL  1,708,249
AIRPLANE
Filed June 11, 1926  2 Sheets-Sheet 1
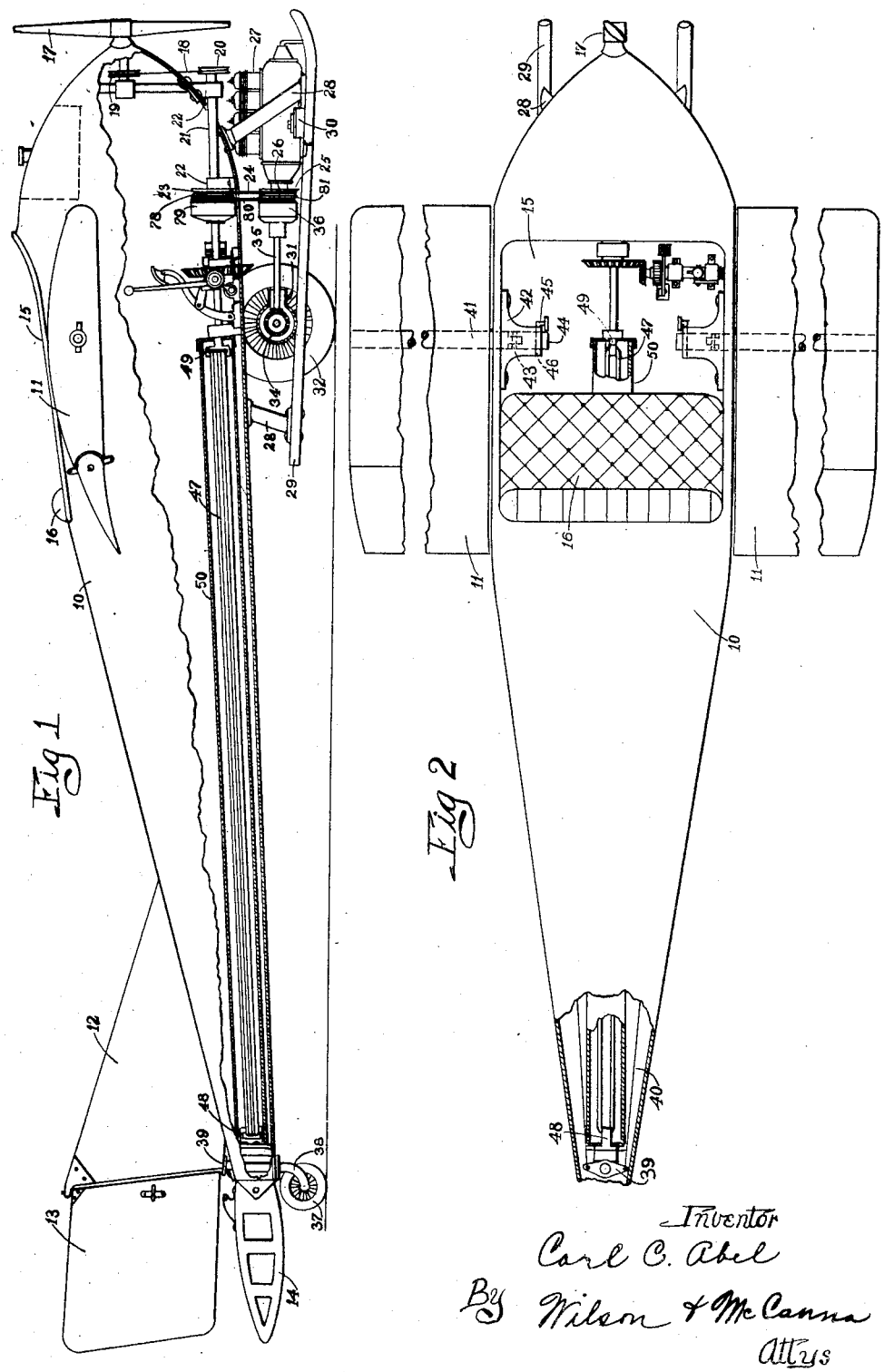

April 9, 1929.  C. C. ABEL  1,708,249
AIRPLANE
Filed June 11, 1926  2 Sheets-Sheet 2
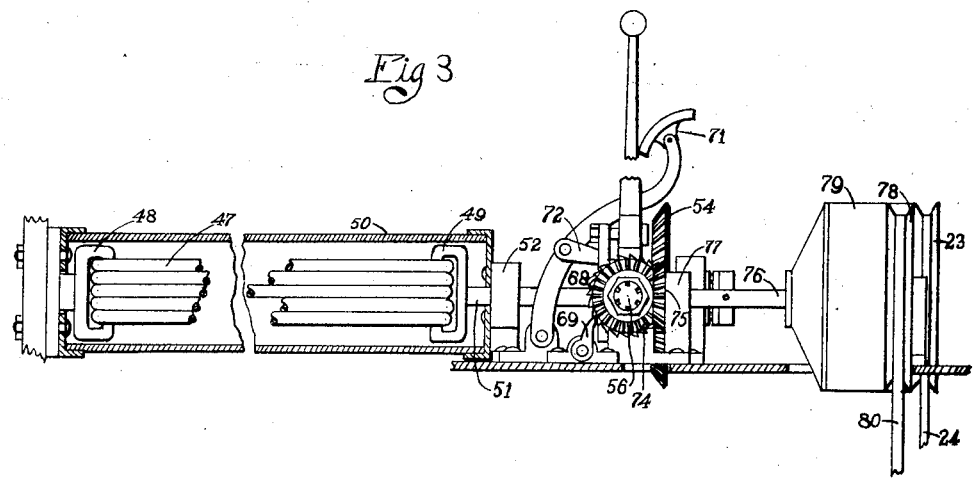
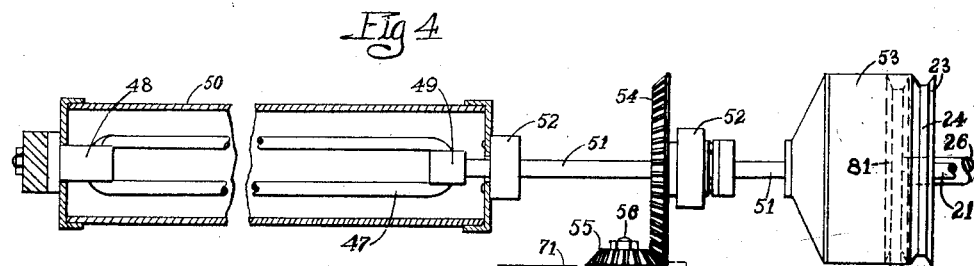
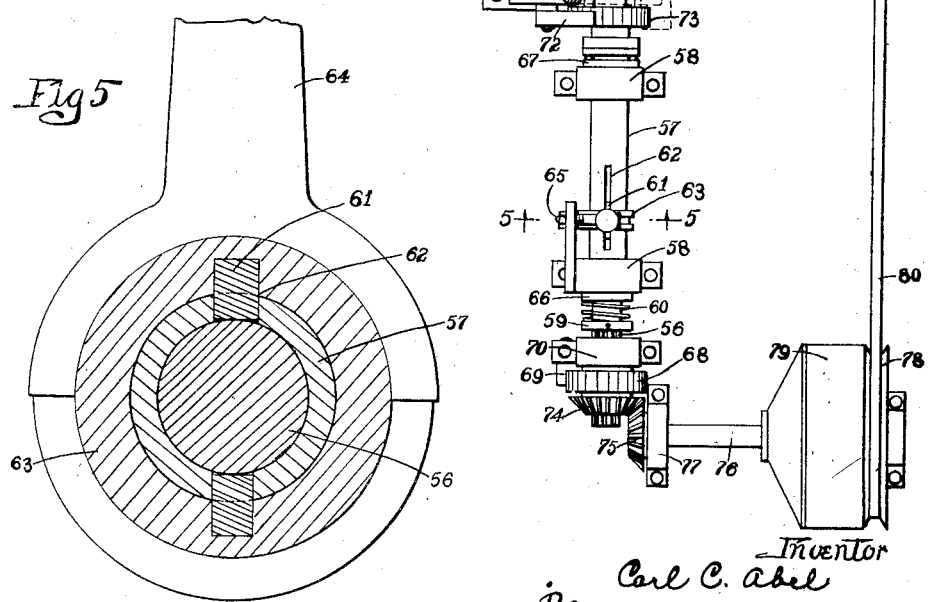
Inventor
Carl C. Abel
By Wilson & McCanna
Attys Patented Apr. 9, 1929.

1,708,249

UNITED STATES PATENT OFFICE.

CARL C. ABEL, OF ROCKFORD, ILLINOIS, ASSIGNOR OF ONE-FIFTH TO J. P. JENSEN, OF ROCKFORD, ILLINOIS.

AIRPLANE.

Application filed June 11, 1926. Serial No. 115,136

This invention relates to airplanes of an especially low powered type and of about as light wing loading as gliders.

The principal object is to provide, in effect, a powered glider, that is, an airplane the power plant of which is just capable of sustaining the plane in flight at a relatively low flying speed, the power plant being in fact hardly capable of accomplishing the take-off of the plane without the aid of a supplemental source of power provided for the purpose.

Another object is to provide an airplane of the character described having driving connections for the landing wheels for the purpose principally of bringing the plane up to its highest attainable taxiing speed in a minimum space upon taking off, the supplemental power means being brought into play at this point to provide the necessary additional propeller thrust for the take-off, it being obvious that only a slight additional expenditure of power will suffice to accomplish the take-off when the plane has already attained a fairly high taxiing speed. The driving of the landing wheels is also of utility in the transporting of the plane to and from the place of flight by taxiing. In furtherance of this purpose there is provided a trailing supporting and steering wheel to facilitate maneuvering the plane around corners and through traffic, and the wings are preferably made foldable to make such use of the plane possible. The driving connection with the landing wheels may also be utilized for braking the speed of the plane upon landing by driving the crank shaft of the engine from the landing wheels in an obvious manner.

Still another object of the invention relates to the provision of means for storing energy in the reserve source of power which may be operated manually by the pilot previous to, during, or after a flight, but is preferably operated through reduction gearing by the engine before taking off as, for example while the engine is being warmed up preparatory to the flight.

Still further objects relate to the provision of a novel underslung mounting of the engine under the nose of the fuselage at the landing gear for efficient air cooling and to facilitate inspection and repair thereof; the provision of an improved landing gear including skids suspended beneath the fuselage and extending longitudinally relative thereto to the fore part thereof whereby they serve as a convenient mounting for the engine and also provide a place for mounting the landing wheels; and the provision in connection with the landing wheels of a differential interconnecting the same for drive purposes in taking off or merely taxiing and providing a connection between the landing wheels and the engine.

These and other objects and advantages of the present invention will appear in the course of the following detailed description in which reference is made to the accompanying drawing forming a part hereof, wherein—

Fig. 1 is a side view of an airplane preferably of the monoplane type embodying the present improvements, portions of the fuselage being broken away to disclose the operating mechanism, and one of the landing wheels being removed and the differential being shown in section to indicate the driving connection between the engine and the landing wheels;

Fig. 2 is a top view of Fig. 1 with sections of the wing surfaces broken away and with the tail structure broken off to conserve space in the drawing;

Fig. 3 is a side view of the reserve power mechanism on an enlarged scale, certain parts being shown in section for the purposes of clear illustration;

Fig. 4 is a plan view of Fig. 3; and

Fig. 5 is an enlarged sectional detail taken on the line 5—5 of Fig. 4 looking in the direction of the arrows.

Throughout the views the same reference numerals are applied to corresponding parts.

The underlying theme of the present invention, as indicated above, is to provide an airplane of a "flivver" type, that is, one designed for universal adoption by reason of its ease and safety in maneuvering, its slow flying and landing speeds, its capacity for taking off and landing in a comparatively small space, and its capacity for transportation with ease to and from the place of flight. For the most part, the airplane of the present invention is designed to resemble a glider because of its exceedingly light wing loading. The provision of the power driven screw propeller is made only with a view to sustaining the plane in flight, it being obvious that a plane otherwise resembling a glider will require an engine of comparatively low power, one of about the size of an ordinary motorcycle engine or smaller. The power of such an engine would obviously be insufficient to accomplish the take-off of the plane and for this reason an additional reserve source of power is provided to furnish the required extra power for the take-off. The light wing loading of the plane coupled with the fact that means are provided for driving the landing wheels along with the propeller when taking off make it possible for the plane to take-off and gain altitude with ease and safety from comparatively small fields or the take-off may be accomplished directly from a highway. The driving of the landing wheels together with the provision of a steering, trailing wheel and foldable wings for the purpose of transporting the plane to and from the place of flight contribute toward the accomplishment of the main purpose of the present invention as expressed above, namely, to provide a plane for general civilian use.

The fuselage 10 of the airplane illustrated in Figs. 1 and 2 is of such diminutive size and light construction as compared with the average airplane that the plane to all intents and purposes is a glider. The wing surface 11, the tail fin 12, rudder 13 and elevator 14 are all proportioned with this purpose in view. The cock-pit 15 affords seat room at 16, preferably for just the pilot. The thought is that the power means together with all of its accessories shall not exceed the weight which would be involved if one additional occupant were carried, it being well known that European gliders have been made capable of carrying two occupants where no power means was provided to sustain the plane in flight. In the present case, the plane is intended generally to follow the specifications of a glider of the type referred to, and to have a power means for sustaining the plane in flight which shall be so light as not to exceed the weight which would otherwise be involved by the additional occupant. This much will suffice for a general understanding as to the type of plane to which the present improvements are intended to be applied.

The plane is equipped with a propeller 17 driven by a belt and pulley connection indicated at 18 and 19 from the pulley 20 carried on a shaft 21 mounted in bearings 22 in the nose of the fuselage 10. The shaft 21 is arranged to be driven with a pulley 23 by a belt connection 24 with a pulley 25 driven with the crank shaft 26 of the engine 27. The driving connection between the propeller 17 and the engine 27 is a permanent one for obvious reasons. The engine 27, as stated above, is to be of such a small size to be capable merely of sustaining the plane in flight and as will later appear to taxi the plane from place to place and during the take-off. The weight of the engine is to be kept to a minimum as, for example, by the making of parts of cast aluminum. Struts 28 are provided beneath the fuselage to support skids 29 which extend longitudinally relative to the fuselage to the fore part thereof and afford a protection to the pilot in the event the plane noses over in landing. I am aware that skids have been used heretofore on training planes. In the present case, I prefer to provide these skids not only as a protective feature but to provide a place for mounting the engine 27, as indicated at 30. The skids also provide a convenient place for mounting the housing for axle sections 31 associated with each of a pair of landing wheels 32. The landing wheels 32 have their axle sections terminating in a differential housing 33 wherein the usual ring gear 34 has a pinion connection with a shaft 35 extending from the housing toward the engine 27. A clutch is provided at 36 for detachably connecting the shaft 35 with the engine 27 whenever desired. Any suitable means may be provided for operating the clutch 36 from the cock-pit 15. The provision of the driving connection between the landing wheels and the engine makes it possible to bring the plane up to its highest attainable taxiing speed in a minimum space when taking off and is of importance in that it adapts the plane to more general use since the place from which the take-off is made need not be of as large an expanse as the average flying field. In fact, the thought is to enable taking off from highways and other places from which a take-off would otherwise be a hazardous feat. As will be pointed out later, when the plane has been brought up to its highest taxiing speed and is on the verge of leaving the ground a reserve power means is made effective to speed up the propeller to insure an immediate gain in altitude. As soon as the plane leaves the ground the clutch 36 may be released so that the full power of the engine is made available for driving the propeller. If desired, the clutch may be engaged upon landing to use the engine as a brake for turning over the crank shaft with the landing wheels in a manner well understood in the automotive field. This feature is, of course, of advantage in that the landing space may be considerably shortened, thus making it possible to land the plane practically at the convenience of the pilot.

The driving of the landing wheels is intended to be utilized in transporting the plane to and from the place of flight as, for example, where the plane is kept in a hangar in the more congested districts which make it impossible to land or take-off in the vicinity of the hangar. The plane is preferably equipped with a trailing, steering and supporting wheel 37 on a caster bracket 38 arranged to be steered suitably by means of a cross bar 39 by cables 40 which are extended to the cock-pit. The provision of the trailing wheel eliminates the drag which would otherwise result if an ordinary tail skid were employed and facilitates the matter of taking off. Principally, however, the purpose in providing the trailing wheel is to enable the pilot to guide the plane around corners and through traffic. The wings 11 for the same reason are arranged to be swung about their supporting shafts 41 into a vertical plane and then folded back alongside the fuselage to be out of the way, there being suitable means for retaining the folded wings in place. The shafts 41 are arranged to be withdrawn slightly from sockets 42 and to hinge at 43 on stubs 44 to accomplish the folding in an obvious manner. The shafts 41 are normally held with the stubs 44 in position suitably by pins 45 bearing in openings 46 provided in the sockets 42. Thus the pins not only serve to keep the wings in place as respects removal outwardly but also serve to keep the wings set at their proper angle of incidence.

The reserve source of power which, as stated above, is designed to speed up the propeller and insure prompt take-off of the plane will now be described. Any suitable means capable of storing energy for this purpose may be employed to furnish the desired additional torque for driving the propeller. In the present embodiment I have illustrated a resilient torque element 47 made up of a number of plies of heavy rubber cord such as is commonly employed as a shock absorbing material for tail skids, landing gear and the like. This element is fixed at one end to a yoke 48 secured in any suitable manner within the tail end of the fuselage. The other end is fixed to a rotatable yoke 49. The yokes 48 and 49 are spaced and enclosed by a casing 50. The yoke 49 is mounted on a shaft 51 received in bearings 52 in the bottom of the cock-pit 15. This shaft is coaxial with the shaft 21' and is arranged to be coupled therewith by means of a clutch 53 whereby to transmit the torque of the element 47 to the propeller 17. Any suitable manually operated means may be employed to operate the clutch 53 as in the case of the clutch 36. The clutch 53, of course, is normally disengaged. Power is stored up in the torque element 47 by the turning of a large bevel gear 54 fixed on the shaft 51. The gear 54 is driven by a small bevel gear 55 which also serves to hold the gear 54 against rotation when the torque element 47 is wound up. The gear 55 is fixed on a shaft 56 received in a sleeve 57 mounted in fixed bearings 58 in the bottom of the cock-pit 15. The shaft 56 has a collar 59 fixed thereon and is normally urged in one direction to disengage the gear 55 from the gear 54 by means of a spring 60 acting between the collar 59 and the sleeve 57. Any suitable means may be employed for holding the shaft against lengthwise movement relative to the sleeve as, for example, the wedges 61 seating in slots 62 in the sleeve 57 and normally held engaged in wedging relation with the shaft 56 by means of a collar 63. The collar may be moved by a hand lever 64 pivoted at 65 to a bracket on one of the bearings 58. The sleeve 57 being held against endwise movement with respect to the fixed bearings as by means of an annular shoulder 66 at one end and a collar 67 at the other, it is obvious that the shaft may be retained in its cocked position until the moment for release of the torque element 47 arrives, whereupon a quick movement of the hand lever 64 will serve to release the same for movement under the action of the spring 60. Normally, however, the shaft 56 is fixed as a unit with the sleeve 57 and the collar 63. All these parts rotate together. The shaft 56 may be turned either manually or by power as will presently appear and is arranged to be held against reverse rotation by means of a ratchet 68 and pawl 69. The ratchet 68 is suitably splined on the shaft 56 as indicated in Fig. 4, adjacent a fixed bearing 70. If manual operation of the shaft 56 is desired to wind up the torque element 47 this may be accomplished by oscillation of a foot pedal 71 having a driving dog 72 thereon to operate on a ratchet wheel 73 fixed on the shaft 56. Such operation may be accomplished either prior to, during, or after a flight and in any event with a view to having the torque element 47 fully wound up for the occasion of taking off. The releasing of the torque element by operation of the hand lever 64 is preferably made coincident with the engaging of the clutch 53 for obvious reasons, and if desired the operating means for engaging the clutch 53 may be connected with the lever 64 to insure the engaging of the clutch at the proper time.

The storing of energy in the torque element 47 is preferably accomplished by power means operated by the engine. For this purpose I prefer to provide a bevel gear 74 suitably fixed to or made integral with the ratchet wheel 68 and splined on the shaft 56. The gear 74 meshes with another bevel gear 75 secured to the shaft 76 adjacent a fixed bearing 77. The shaft 76 is arranged to be coupled with an otherwise idly operating pulley 78 through a clutch at 79. The pulley 78 is driven with the crank shaft 26 of the engine 27 by a belt and pulley connection shown at 80 and 81. By means of this detachable driving connection between the engine 27 and the shaft 56 it is obvious that the winding up of the torque element 47 may be accomplished to advantage just before taking off when the engine is being warmed up, and would otherwise be operating without load. The reduction gearing 55 and 54 affords the necessary mechanical advantage so that the engine, which is of considerably less power, is made effective in the winding up of the more powerful torque element 47 which acts as the reserve source of power. The reduction gearing referred to is, of course, also available in the case of manual operation for a similar purpose. The gears 74 and 75, previously referred to, are maintained in constant mesh despite the lengthwise movement of the shaft 56 by the bearings 70 and 77 in a manner requiring no explanation.

It will thus appear that a considerable number of turns may be stored in the torque element 47 to be available at the time of taking off to give the necessary additional propeller thrust required in gaining altitude quickly. Very little space is required in accomplishing the take-off in this manner especially since the plane is promptly brought up to its highest attainable speed by the driving of the landing wheels.

It is believed that the foregoing description conveys a complete understanding of the invention and all of the objects and advantages stated above. It will be apparent to anyone skilled in the art that the particular mechanism herein shown and described is intended merely to convey an understanding of the invention and that considerable departure may be made therefrom within the general spirit and scope of the invention as expressed by the appended claims.

I claim:

1. In an airplane of light wing loading to be maneuverable as a glider, a propeller therefor, a single low powered engine for driving the same sufficient to keep the plane in flight, mechanical means wherein reserve power may be stored for use when desired to augment the power of the engine on the take-off of the plane, means under manual control for operating the last mentioned means to store energy therein, and another means under manual control to connect the same with the propeller.

2. In an airplane as set forth in claim 1, the provision of manually operable means to have connection with said energy storing means to supply energy thereto.

3. In an airplane as set forth in claim 1, the provision of reduction gearing to operate said energy storing means in one direction to store energy therein, a manually operable means for operating said first mentioned means through said reduction gearing, a driving connection between said first mentioned means and said engine through said reduction gearing, and a clutch for detachably connecting said means with said engine.

4. In an airplane, the combination of a propeller, an engine for driving the same, a reserve source of power arranged for detachable driving connection with said propeller, means for storing power in said reserve source, said means being operable either manually or by the power of said engine, and a clutch for connecting said reserve power source with said propeller.

5. In an airplane comprising a fuselage provided with skids having landing wheels mounted thereon, propelling means, an underslung power plant for the propelling means suspended beneath the fore part of the fuselage on said skids in front of and close to said wheels, and means providing driving connections between said wheels and the power plant.

6. In an airplane comprising a fuselage having a suitable landing gear, a propeller, an engine for driving the same, and a reserve source of power for driving said propeller, said reserve source of power comprising a torque element extending lengthwise of the fuselage and arranged to be twisted to store up energy therein.

7. In an airplane as set forth in claim 6, the provision of a torque element comprising a fixed yoke near one end of said fuselage, a rotatable yoke toward the other end of said fuselage, and a plurality of laps of resilient material connecting said yokes.

8. In an airplane, a fuselage having wings of the monoplane type arranged to swivel from approximately horizontal position to approximately vertical position, and then to fold to a position alongside the fuselage to cut down the over-all width of the airplane so as to facilitate transportation to and from the place of flight and also facilitate storage in the hangar, and means for detachably securing each of the wings in its horizontal position comprising a shaft supporting the wing having a stub piece pivotally mounted on the inner end thereof, a bearing on the fuselage for said stub piece and the inner end portion of said shaft, and means for detachably securing the stub piece and shaft in said bearing holding the same against turning relative to the bearing and against moving endwise with respect thereto, the last mentioned means when detached permitting endwise movement of the shaft and stub piece outwardly with respect to said bearing whereupon the shaft is swingable relative to the stub piece for the folding of the wing.

9. In an airplane the combination of a propeller, an engine for driving the same, means wherein reserve power may be stored for use when desired to augment the power of the engine for the take-off of the plane, means including reduction gearing for detachably connecting said means with said engine whereby to store power therein for future use, and means for detachably connecting the reserve power means with the propeller at the time desired, the said means providing practically a direct operating connection as distinguished from the reduction gearing connection above referred to.

10. The combination set forth in claim 9 having in addition means for locking the reserve power means in inoperative relation, and a manually operable member arranged for quickly releasing the reserve power means at a time desired.

11. The combination as set forth in claim 9 including manually operable means also operable through the reduction gearing referred to for storing power in the reserve power means.

12. In an airplane of light wing loading, a propeller, a single low-powered engine for driving the same sufficient to keep the plane in flight, landing wheels, means for detachably connecting the same with the engine permitting the driving thereof to bring the plane up to a certain taxiing speed, means wherein reserve power is arranged to be stored for use at the time of take-off to augment the power of the engine, and means under manual control for connecting the last mentioned means with the propeller.

13. In an airplane, the combination of a propeller, an engine for driving the same, means wherein reserve power may be stored to augment the power of the engine when desired, means manually operable and including reduction gearing for operating the last mentioned means to store power therein for future use, and means for detachably connecting the reserve power means with the propeller at the time desired, the said means providing substantially a direct driving connection as distinguished from the reduction gearing connection above referred to.

14. The combination set forth in claim 13 including means for locking the reserve power means in inoperative relation, and a manually operable means arranged for quickly releasing the reserve power means at the time desired.

In witness of the foregoing I affix my signature.

CARL C. ABEL.